United States Patent
Cordell et al.

(10) Patent No.: US 6,169,887 B1
(45) Date of Patent: Jan. 2, 2001

(54) RANGE EXTENSION WITHIN A COMMUNICATION SYSTEM

(75) Inventors: Donald Paul Cordell, Woodstock; Terry Michael Schaffner, Palatine, both of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/260,697

(22) Filed: Mar. 2, 1999

(51) Int. Cl.[7] .................................................. H04B 7/216
(52) U.S. Cl. ...................... 455/242.2; 485/506; 375/206; 370/342
(58) Field of Search .................................. 455/218–225, 455/296, 506, 227, 228, 31.1, 229, 231, 272–279.1, 242.1–250.1; 375/147–149, 205, 206, 260, 342, 349, 200; 370/203, 208, 209, 335, 342, 441, 479, 491

(56) References Cited

U.S. PATENT DOCUMENTS

| | | | |
|---|---|---|---|
| 5,638,376 | * 6/1997 | Miki et al. | 370/342 |
| 5,767,738 | * 6/1998 | Brown et al. | 329/304 |
| 5,787,130 | * 7/1998 | Kotzin et al. | 375/346 |
| 5,815,525 | * 9/1998 | Smith et al. | 375/200 |
| 5,838,669 | * 11/1998 | Gerakoulis | 370/320 |
| 5,894,473 | * 4/1999 | Dent | 370/342 |
| 5,894,500 | * 4/1999 | Bruckert et al. | 375/346 |
| 5,953,365 | * 9/1999 | Badke | 375/200 |
| 5,956,619 | * 4/1999 | Gallagher et al. | 455/12.1 |
| 5,978,413 | * 11/1999 | Bender | 375/206 |

* cited by examiner

Primary Examiner—Daniel S. Hunter
Assistant Examiner—Pablo Tran
(74) Attorney, Agent, or Firm—Kenneth A. Haas

(57) ABSTRACT

Receivers (201, 202) within a base station (101) receive a transmission from a remote unit (114). The received signal is delayed a first amount by first delay circuitry (203), and a second amount by second delay circuitry (204). During despreading, a delayed input signal is despread with a Pseudo-Random (PN) code. The system time utilized by the PN generators (213, 214) is delayed a third time period by third and fourth delaying circuitry (215, 216).

16 Claims, 2 Drawing Sheets

RANGE EXTENSION WITHIN A COMMUNICATION SYSTEM

FIELD OF THE INVENTION

The present invention relates generally to communication systems and, in particular, to extending the range of a base site in a cellular communication system.

BACKGROUND OF THE INVENTION

In current Code Division, Multiple Access (CDMA) communication systems, receivers (channel elements) restrict a search and demodulation window to 512 chips. More particularly, a remote unit accessing a CDMA communication system can have a round-trip delay of no more than 416 micro seconds (512 chips), or equivalently, a maximum distance of 62 kilometers (km) from the base station. Remote units with a larger delay than 512 chips will not be within a base station's search window, and will not be acquired by the base station.

Although the above restriction on round-trip delay is adequate for most urban areas, there exists locations where a maximum cell size of greater than 62 km is desired. For example, along coastal areas, or within very sparsely populated locations, it may be economically unfeasible to have small cell sizes. Therefore a need exists for a base station that has an extended cell size. Additionally, it would be beneficial if existing CDMA equipment can be inexpensively modified to provide such coverage.

DETAILED DESCRIPTION OF THE DRAWINGS

Figure 1:
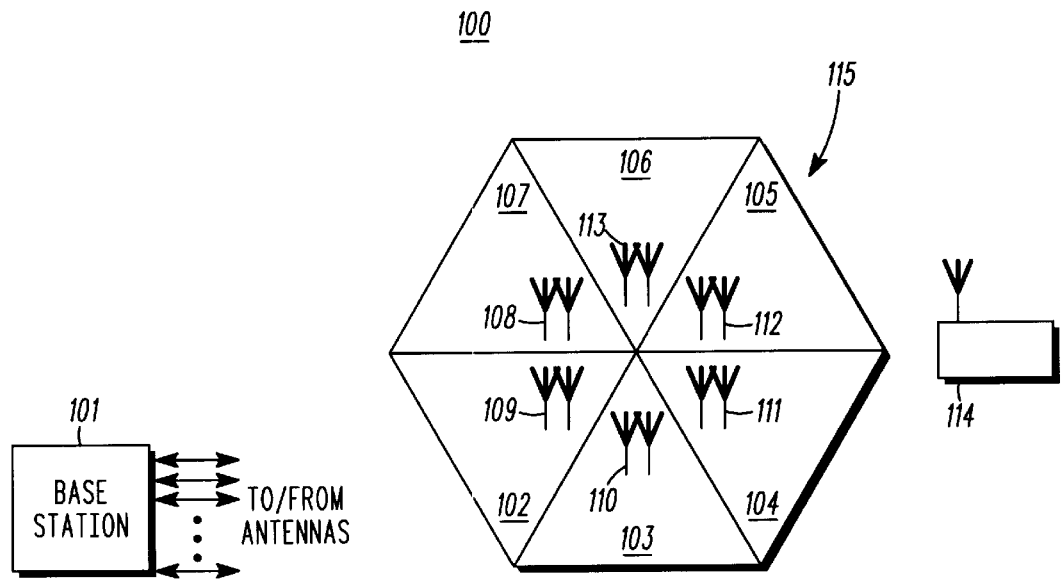
FIG. 1 is a block diagram of a communication system in accordance with the preferred embodiment of the present invention.

To address the need for a base station having an extended cell size, a method and apparatus for extending the cell size of a base station is provided. Receivers within a base station receive a transmission from a remote unit. The received signal is delayed a first amount by first delay circuitry, and a second amount by second delay circuitry. During despreading, a delayed input signal is despread with a Pseudo-Random (PN) code. The system time utilized by the PN generators is delayed a third time period by third and fourth delaying circuitry. As a result of delaying system time, the PN sequence utilized to despread the delayed signals will not repeat on the even second of system time, but will begin repeating a time period after every even second of system time. By delaying the signal input into a receiver, as well as delaying system time utilized by the PN generator, allows base stations to receiving transmissions from remote units outside the normal 512 chip window. Additionally, existing base stations can be inexpensively modified in accordance with the preferred embodiment by the addition of delay circuitry as described above.

The present invention encompasses an apparatus for range extension within a communication system. The apparatus comprises a first receiver comprising a first input signal delay having a received signal as an input and outputting the received signal delayed a first time period. The receiver additionally comprises a first despreader having the received signal delayed the first time period as an input and outputting a first despread signal, wherein the first despreader utilizes a spreading code that is delayed a second time period with respect to system time.

The present invention additionally encompasses a method for range extension within a communication system. The method comprises the steps of receiving a first signal and delaying the first signal a first time period to produce a first delayed signal. The delayed signal is despread utilizing a spreading code that has been delayed a second time period in order to receive signals transmitted within a first range. The method additionally comprises the steps of receiving a second signal and delaying the second signal a third time period to produce a second delayed signal. The second delayed signal is despread utilizing the spreading code that has been delayed the second time period in order to receive signals transmitted within a second range.

The present invention additionally encompasses a method for range extension within a Code Division, Multiple Access (CDMA) communication system. The method comprises the steps of receiving a first signal transmitted from a remote unit and delaying the first signal a first time period to produce a first delayed signal. In this embodiment of the invention the first time period is equal to a time period selected from the group consisting of $0, N, 2N, \ldots, (K-1)N$, where N is a maximum search and demodulation range of the second receiver and K is the maximum round-trip delay divided by N, rounded up to a nearest integer. The first delayed signal is despread utilizing a Pseudo-Random (PN) code that has been delayed a second time period in order to receive signals transmitted within a first range. The method also comprises the steps of receiving a second signal transmitted from the remote unit and delaying the second signal a third time period to produce a second delayed signal. In this embodiment of the present invention the third time period is equal to a time period selected from the group consisting of $0, N, 2N, \ldots, (K-1)N$. Finally, the second delayed signal is despread utilizing the PN code that has been delayed the second time period in order to receive signals transmitted within a second range.

Turning now to the drawings, where like numerals designate like components, FIG. 1 is a block diagram of communication system 100 in accordance with the preferred embodiment of the present invention. In the preferred embodiment of the present invention, communication system 100 utilizes a CDMA system protocol as described in Cellular System Remote unit-Base Station Compatibility Standard of the Electronic Industry Association/Telecommunications Industry Association Interim Standard 95-B (TIA/EIA/IS-95B), which is incorporated by reference herein. (EIA/TIA can be contacted at 2001 Pennsylvania Ave. NW Washington D.C. 20006). In alternate embodiments communication system 100 may utilize other analog or digital cellular communication system protocols such as, but not limited to, the Narrow band Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol. Communication system 100 includes sectorized cell 115, and base station 101 which is suitably coupled to antennas 108–113. Although not shown, one of ordinary skill in the art will recognize that base station 101 is additionally coupled to necessary infrastructure equipment such as Centralized Base Station Controllers (CBSCs), Mobile Switching Centers (MSCs), and the like.

In the preferred embodiment of the present invention maximum cell range is increased by increasing the range for specified sectors 102–107 only. Thus, in the preferred embodiment of the present invention each sector 102–107 of cell site 115 has a maximum and minimum operational range. A first sector (e.g., sector 104) may receive remote units within a first region (e.g., 0–62 km from base station 101), while an adjacent sector (e.g., sector 105) will receive only remote units within a second region (between 62 km and 124 km from base station 101). Additionally, as will be described below, the maximum cell radius of cell 115 is increased without requiring a redesign of the existing infrastructure equipment's receivers.

Figure 2:
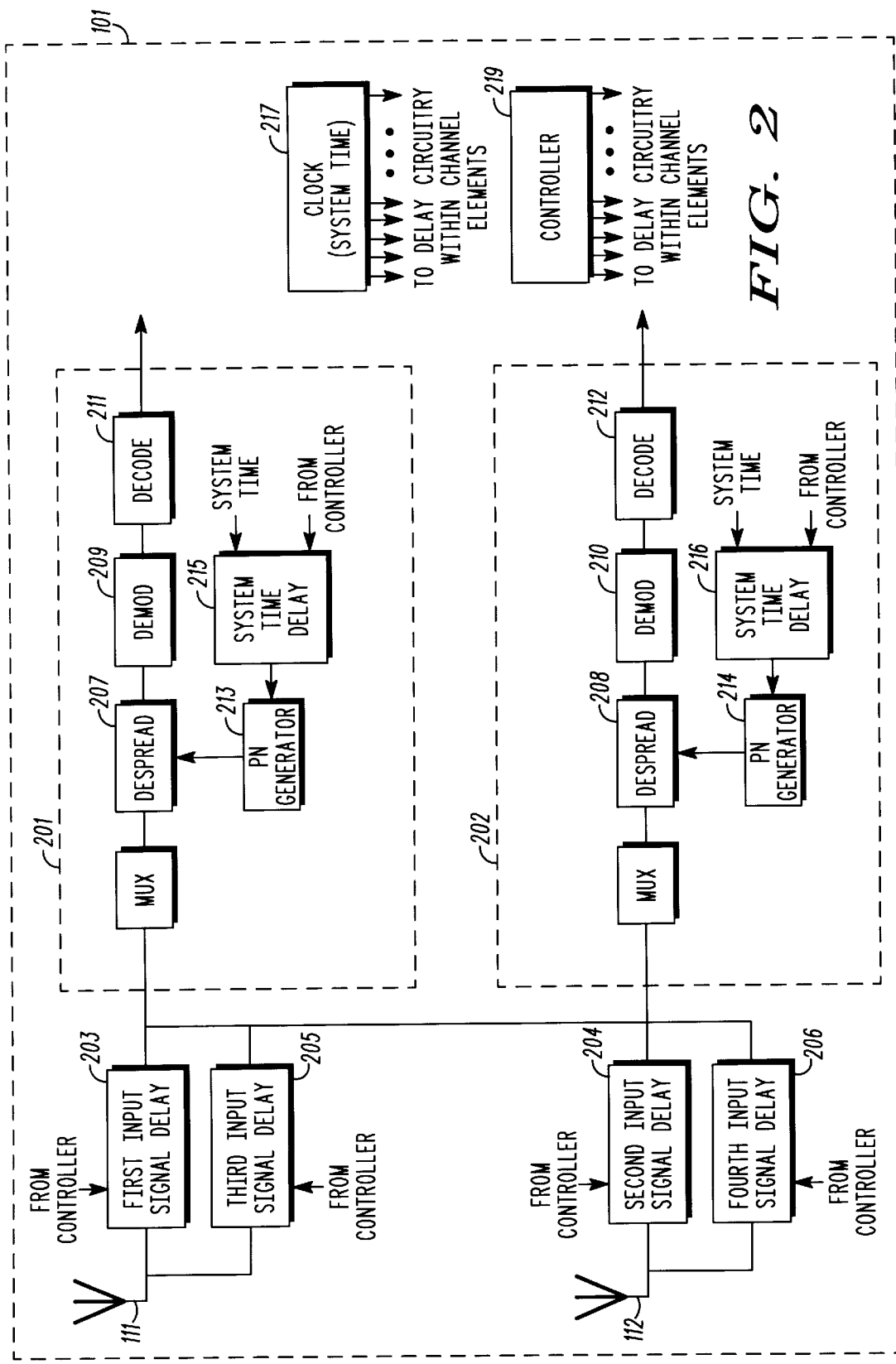
FIG. 2 is a block diagram of the base station of FIG. 1 in accordance with the preferred embodiment of the present invention.

FIG. 2 is a block diagram of base station 101 in accordance with the preferred embodiment of the present invention. As shown base station 101 comprises first receiver 201 and second receiver 202. Although only two receivers are shown, one of ordinary skill in the art will recognize that typical base stations comprise many receivers. For example, the Motorola J-CDMA Base Station (SC4840) contains twelve channel cards with 24 receivers residing on each card, resulting in a total of 288 receivers. FIG. 2 additionally shows receivers 201 and 202 having a single antenna port with antennas 111 and 112 as inputs, however, one of ordinary skill in the art will recognize that multiple antennas may be input into receivers 201 and 202 in order to gain diversity benefits. In the preferred embodiment of the present invention receiver 201 and receiver 202 have input antennas (111 and 112, respectively) originating from differing sectors (104 and 105, respectively).

As shown, base station 101 comprises input signal delay circuitry 203–206, and each receiver comprises system time delay circuitry 215, 216, despreading circuitry 207, 208, demodulating circuitry 209, 210, decoding circuitry 211, 212, and PN generators 213, 214. Base station 101 additionally comprises clock 217 to provide system time, and controller 219. In the preferred embodiment of the present invention delay circuitry 203–206 is a standard digital delay line, and delay circuitry 215–216 is a counter which produces a delayed version of the original system reference pulse. Both of these delay circuits serve to delay signals input into the circuitry for a finite period of time.

Prior to describing operation of base station 101, the following text and equations are provided to show derivation of the time delays utilized by delay circuitry 203–206 and 215–216.

Assume that N is the maximum search and demodulation range of a receiver, and K is the number of search windows that are necessary for covering the desired range. K is equal to the maximum round-trip delay divided by N, rounded up to the nearest integer (i.e., K=Round_up((maxRTD/N)). For example, if a maximum search and demodulation range of a receiver is 512 chips (62 km), and it is desired that base station 101 be able to receive calls having delays of 826 chips (100 km), then N=512 and K=2 (Round_up(826/512)). In the preferred embodiment of the present invention system time delay circuitry 215 and 216 delay system reference time by a time period equal to (K−1)N.

In the preferred embodiment of the present invention signals input into receivers 201–202 are delayed for a period of time prior to being despread. The period of time that a particular signal is delayed is dependent upon a particular range that the receiver wishes to cover. In the preferred embodiment of the present invention these delays are integer multiples of N, up to (K−1)N (i.e., 0, N, 2N, . . . , (K−1)N). Using the above example, with N=512 and K=2, there exist two distinct input signal delays utilized by base station 101 (0 and 512 chips). Therefore, when K=2, system time is delayed by N, and receivers having no delay perceive a signal transmitted with an 826 chip offset, as being transmitted with a 326 chip offset. In other words, actual PN offsets of (K−1)N to KN appear to be offset only 0 to N for the non-delayed baseband input.

It should be noted that receivers having delays of jN receive remote units having PN offset ranges of (NK−N−jN) to (NK−jN). Therefore, any remote unit with a range between (NK−N−jN) and (NK−jN) will be received by the receiver delayed by jN, and will not be received by receivers having different input signal delays since the signal will lie outside of the receiver's search window. This is illustrated in Table 1 for N=512, K=3, and system time delayed 1024 chips.

TABLE 1

Illustration of perceived chip offsets at varying distances from a base station.

| Input signal delay | Perceived offset for remote unit transmitting between 0–62 km (0–511 chip offset) | Perceived offset for remote unit transmitting between 63–124 km (512–1023 chip offset) | Perceived offset for remote unit transmitting between 125–186 km (1024–1535 chip offset) |
|---|---|---|---|
| 0 chips | −1024 to −513 chips | −512 to −1 chips | 0 to 511 chips |
| 512 chips | −512 to −1 chips | 0 to 511 chips | 512 to 1023 chips |
| 1024 chips | 0 to 511 chips | 512 to 1023 chips | 1024 to 1535 chips |

As illustrated in Table 1, when system time is delayed 1024 chips, receivers having input signal delays of zero chips will perceive remote units between 125 and 186 km as having chip offsets of between 0 and 511. Likewise, receivers having input signal delays of 512 chips, will perceive remote units between 63 and 124 km as having chip offsets between 0 and 511. Finally, receivers having input signal delays of 1024 chips will perceive remote units between 0 and 62 km as having chip offsets between 0 and 511. All receivers will be unable to receive remote units whose transmissions are perceived to be outside the 0 to 511 chip window.

The above-described base station is capable of receiving transmissions from remote units outside the normal 512 chip window. In fact, the above-described base station can receive transmissions from remote units that are delayed up to KN chips. Additionally, existing base stations can be inexpensively modified in accordance with the preferred embodiment by the addition of delay circuitry as described above.

Figure 3:
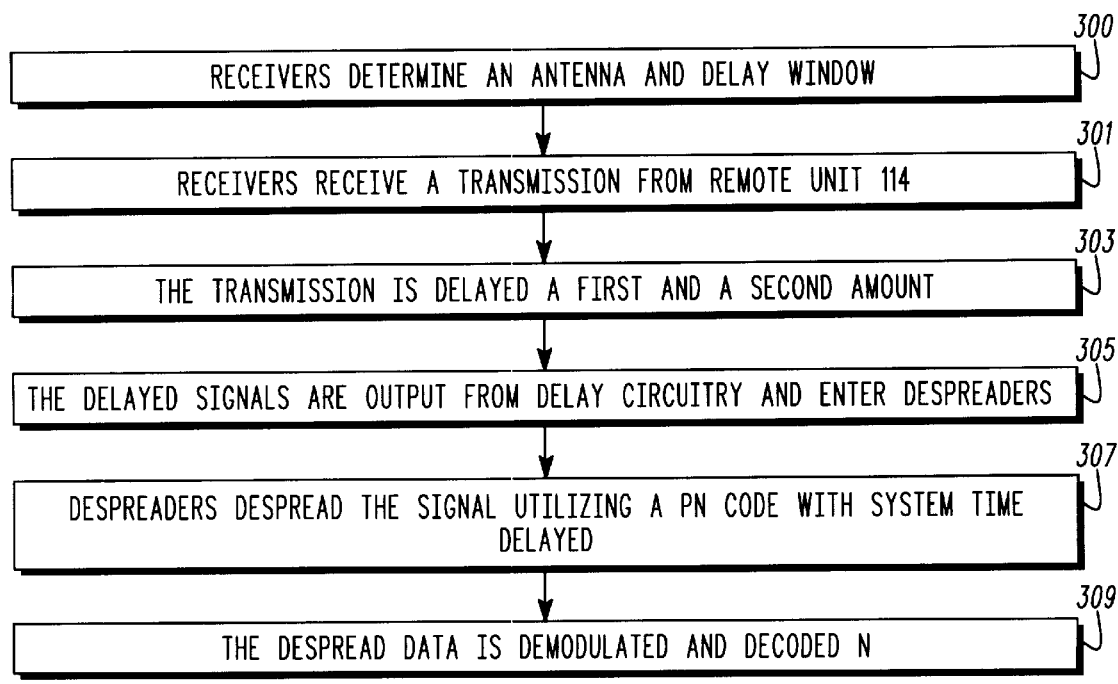
FIG. 3 is a flow chart showing operation of the base station of FIG. 1 in accordance with the preferred embodiment of the present invention.

FIG. 3 is a flow chart showing operation of the base station of FIG. 1 in accordance with the preferred embodiment of the present invention. The logic flow begins at step 300 where receivers 201–202 determine an antenna and delay window that it chooses to demodulate (e.g., antenna 111 with first delay 203, and antenna 112 with second delay 204). In particular, in the preferred embodiment of the present invention each receiver may choose to demodulate signals from any antenna coupled to base station 101. Additionally, each antenna has multiple signal delays that may be chosen by receivers 201–202, depending upon an amount of range extension desired for base station 101. In the preferred embodiment of the present invention multiplexers within each receiver 201–202 choose an antenna and a particular delay from all possibilities of antenna/delay combinations. For purposes of this example it is assumed that receiver 201 chooses antenna 111, having delay 203 as an input, and receiver 202 chooses antenna 112, having delay 204 as an input.

Continuing, at step 301 receivers 201 and 202 receive a transmission from remote unit 114. At step 303 the received signal is delayed a first amount by circuitry 203, and a second amount by circuitry 204. As discussed above, these delays are integer multiples of N, up to (K−1)N (i.e., 0, N, 2N, ..., (K−1)N). Additionally, delay circuitry 203 and 204 may exist after demodulating the received signal into its baseband components, or may simply serve to delay the received radio-frequency (RF) signal prior to demodulation.

At step 305 the delayed signals are output from delay circuitry 203 and 204, and enter despreaders 207 and 208 respectively. At step 307 despreaders 207 and 208 utilize standard CDMA despreading techniques to despread the delayed signals. More particularly, during despreading, the delayed input signal is despread with a Pseudo-Random (PN) code. The PN code is a 32,768 bit sequence that repeats exactly 75 times every 2 seconds with a chip rate of 1.2288 MegaChips per second. In standard CDMA systems the PN sequence is synchronized to repeat on every even second of system time. Although in the preferred embodiment of the present invention the spreading code utilized is a PN code, one of ordinary skill in the art will recognize that other spreading codes may be utilized as well. At step 307 the system time utilized by PN generators 213 and 214 is delayed a third time period equal to (K−1)N chips by circuitry 215 and 216, respectively. As a result of delaying system time, the PN sequence utilized to despread the delayed signals will not repeat on the even second of system time, but will begin repeating (K−1)N chips after every even second of system time.

Finally, at step 309 the despread data is demodulated by demodulator 209 and decoded by decoder 211. In the preferred embodiment of the present invention despreading and demodulation operations are standard CDMA demodulating/decoding operations described in detail in IS-95B.

As described above, receivers having input signal delays of jN receive remote units having PN offset ranges of (NK−N−jN) to (NK−jN) when system time is delayed by (K−1)N. Therefore, any remote unit with a range between (NK−N−jN) and (NK−jN) will be received by the receiver delayed by jN, and will not be received by receivers having different input signal delays since the signal will lie outside of the receiver's search window. The result is a base station capable of receiving transmissions from remote units outside the normal operating window. Additionally, the above-described base station can receive transmissions from remote units that are delayed up to KN chips with receivers having input signal delays of jN. Additionally, existing base stations can be inexpensively modified in accordance with the preferred embodiment by the addition of delay circuitry as shown.

Also note that in the preferred embodiment each receiver is a RAKE receiver having multiple despreaders. A multiplexer is provided for each despreader to select an antenna and delay. The output of the despreaders are separately demodulated, combined together, then decoded. Each receiver, therefore, has the ability to demodulate received signals spread across multiple windows.

The descriptions of the invention, the specific details, and the drawings mentioned above, are not meant to limit the scope of the present invention. For example, in alternate embodiments of the present invention a cells radius can be expanded or contracted by adjusting the delay times for circuitry 203, 204, 215, and 216 accordingly. It is envisioned in such an embodiment that controller 219 utilizes clock 217 (system time) and dynamically adjusts all delay circuitry to utilize an appropriate delay. For example, during a first time period (e.g., day time hours) controller may delay system time by 1024 chips in order to extend the base station's range to 186 km, and during a second time period (e.g., night time hours) controller may delay system time by 512 chips in order to extend the base station's range to 124 km. It is the intent of the inventors that various modifications can be made to the present invention without varying from the spirit and scope of the invention, and it is intended that all such modifications come within the scope of the following claims and their equivalents.

What is claimed is:

1. An apparatus for range extension within a communication system, the apparatus comprising:
   a first receiver comprising:
      a first input signal delay having a received signal as an input and outputting the received signal delayed a first time period; and
      a first despreader having the received signal delayed the first time period as an input and outputting a first despread signal, wherein the first despreader utilizes a spreading code that is delayed a second time period with respect to system time, wherein the first time period is equal to a number selected from the group consisting of 0, N, 2N, ..., (K−1)N, where N is a maximum search and demodulation range of the first receiver and K is the maximum round-trip delay divided by N, rounded up to a nearest integer.

2. The apparatus of claim 1 further comprising:
   a second receiver comprising:
      a second input signal delay having the received signal as an input and outputting the received signal delayed a third time period; and
      a second despreader having the received signal delayed the third time period as an input and outputting a second despread signal, wherein the second despreader utilizes the spreading code that is delayed the second time period with respect to system time.

3. The apparatus of claim 2 wherein the third time period is equal to a number selected from the group consisting of 0, N, 2N, ..., (K−1)N, where N is a maximum search and demodulation range of the second receiver and K is the maximum round-trip delay divided by N, rounded up to a nearest integer.

4. The apparatus of claim 2 wherein the received signal input into the first input signal delay originates from a first sector of a base station and the received signal input into the second input signal delay originates from a second sector of the base station.

5. The apparatus of claim 1 wherein the first despreader utilizes a Pseudo-Random (PN) code during despreading.

6. The apparatus of claim 1 wherein the second time period is substantially equal to (K−1)N, where N is a maximum search and demodulation range of the first receiver and K is the maximum round-trip delay divided by N, rounded up to a nearest integer.

7. The apparatus of claim 1 further comprising a multiplexer coupled to the first receiver.

8. A method for range extension within a communication system, the method comprising the steps of:
   receiving a first signal;
   delaying the first signal a first time period to produce a first delayed signal;

despreading the first delayed signal utilizing a spreading code that has been delayed a second time period in order to receive signals transmitted within a first range;

receiving a second signal;

delaying the second signal a third time period to produce a second delayed signal; and despreading the second delayed signal utilizing the spreading code that has been delayed the second time period in order to receive signals transmitted within a second range, wherein the step of despreading the first delayed signal utilizing the spreading code that has been delayed the second time period comprises the step of despreading the first delayed signal utilizing the spreading code that has been delayed a time period substantially equal to (K−1)N, where N is a maximum search and demodulation range of the first receiver and K is the maximum round-trip delay divided by N, rounded up to a nearest integer.

9. The method of claim 8 wherein the step of delaying the first signal the first time period comprises the step of delaying the first signal the first time period wherein the first time period is equal to a time period selected from the group consisting of 0, N, 2N, ..., (K−1)N, where N is a maximum search and demodulation range of the second receiver and K is the maximum round-trip delay divided by N, rounded up to a nearest integer.

10. The method of claim 8 wherein the step of despreading the first delayed signal utilizing the spreading code that has been delayed the second time period comprises the step of despreading the first delayed signal utilizing the spreading code that has been delayed a time period substantially equal to (K−1)N, where N is a maximum search and demodulation range of the first receiver and K is the maximum round-trip delay divided by N, rounded up to a nearest integer.

11. The method of claim 8 wherein the step of despreading the second delayed signal utilizing the spreading code that has been delayed the second time period comprises the step of despreading the second delayed signal utilizing the spreading code that has been delayed a time period substantially equal to (K−1)N, where N is a maximum search and demodulation range of the first receiver and K is the maximum round-trip delay divided by N, rounded up to a nearest integer.

12. The method of claim 8 wherein the step of receiving the first signal comprises the step of receiving the first signal from a first sector of a base station, and the step of receiving the second signal comprises the step of receiving the second signal from a second sector of the base station.

13. The method of claim 8 wherein the step of despreading comprises despreading with a Pseudo-Random (PN) code.

14. A method for range extension within a Code Division, Multiple Access (CDMA) communication system, the method comprising the steps of:

receiving a first signal transmitted from a remote unit;

delaying the first signal a first time period to produce a first delayed signal, wherein the first time period is equal to a time period selected from the group consisting of 0, N, 2N, ..., (K−1)N, where N is a maximum search and demodulation range of the second receiver and K is the maximum round-trip delay divided by N, rounded up to a nearest integer;

despreading the first delayed signal utilizing a Pseudo-Random (PN) code that has been delayed a second time period in order to receive signals transmitted within a first range;

receiving a second signal transmitted from the remote unit;

delaying the second signal a third time period to produce a second delayed signal, wherein the third time period is equal to a time period selected from the group consisting of 0, N, 2N, ..., (K−1)N; and despreading the second delayed signal utilizing the PN code that has been delayed the second time period in order to receive signals transmitted within a second range.

15. The method of claim 14 wherein the step of despreading the first delayed signal utilizing the spreading code that has been delayed the second time period comprises the step of despreading the first delayed signal utilizing the spreading code that has been delayed a time period substantially equal to (K−1)N, where N is a maximum search and demodulation range of the first receiver and K is the maximum round-trip delay divided by N, rounded up to a nearest integer.

16. The method of claim 14 wherein the step of despreading the second delayed signal utilizing the spreading code that has been delayed the second time period comprises the step of despreading the second delayed signal utilizing the spreading code that has been delayed a time period substantially equal to (K−1)N, where N is a maximum search and demodulation range of the first receiver and K is the maximum round-trip delay divided by N, rounded up to a nearest integer.

* * * * *